United States Patent Office 2,901,438
Patented Aug. 25, 1959

2,901,438

CORROSION INHIBITORS

Lewis M. Rogers, Kemah, Tex., assignor to Union Carbide Corporation, a corporation of New York No Drawing. Application October 25, 1956
Serial No. 618,190

7 Claims. (Cl. 252—387)

The present invention relates to corrosion inhibition. More specifically, the invention relates to a novel method for rendering sea water less corrosive, and particularly to a method for inhibiting the corrosion of metals therein.

The high rates of corrosion that occur when ferrous metals, such as cast-iron and steel, are maintained in continuous or intermittent contact with sea water are well known. Corrosion of this nature has long proved a costly problem, especially to those engaged in marine transportation. Sea water, for example, is commonly employed as ballast to fill the metal tanks or other storage compartments of transport vessels when little or no cargo is aboard. The utilization of sea water in this manner, however, readily engenders metal corrosion within the vessel, whereby the following disadvantages may accrue: a shorter life for the vessel; increased cost and time for repairs thereof; and contamination of products subsequently carried within the tanks or other compartments employed as containers for the ballast.

Although wide variations in temperature and salinity exist from place to place, surprisingly small differences in the corrosion of ferrous metals have been encountered when they are exposed to corrosion by ordinary sea water at different points throughout the world. Sea water corrosion, however, has been found to differ in both type and intensity from the corrosion encountered when these metals are exposed to either domestic waters, or simple salt solutions, such as brine water. Sea water corrosion is, in addition, much more difficult to hinder or prevent. Consequently, the usual corrosion inhibitors often prove ineffectual when employed in a sea water environment, or they may require utilization in high concentrations, resulting in a cost not commensurate with the advantage of increased inhibition.

It is an object of the present invention to provide a novel, efficient and economical method for rendering sea water less corrosive. It is another object to provide chemical inhibitors for the corrosion of ferrous metals in sea water which will be effective in low concentrations.

According to the present invention, sea water may be rendered less corrosive by the addition thereto of orthophosphoric acid, or aromatic esters of orthophosphoric acid. In this manner, the corrosion of ferrous metals exposed to such environment is substantially inhibited, even at low concentrations of the acid or acid ester.

In addition to orthophosphoric acid, pyridine phosphate and aniline phosphate have been found to engender particularly good results. Other alkylated pyridine phosphates, however, may also be employed as inhibitors for sea water corrosion, when utilized in accordance with the method of the invention.

In a preferred embodiment of the invention, the inhibitor is added to sea water in a concentration of between 50 to 150 parts per million parts of sea water. While concentrations within this range have been found to inhibit the sea water corrosion of ferrous metals most effectively, slightly higher or lower concentrations of acid or acid esters may also be employed with beneficial results. However, at pH values of less than 4.5, the corrosion of ferrous metals in sea water proceeds at increased rates, as controlled by hydrogen evolution rather than by normal oxygen depolarization. The maximum concentration of inhibitor to be employed in the method of the invention, therefore, should be limited to those amounts effecting a pH of not less than 4.5 in sea water. This limiting pH value is reached, for example, at an orthophosphoric acid concentration of approximately 250 parts per million parts of sea water. Operation at acid concentrations in excess of this amount ordinarily will result in increased corrosion, as heretofore described.

The following table may better illustrate the effect orthophosphoric acid and aromatic esters of orthophosphoric acid have upon the sea water corrosion of ferrous metals. The tabulated results were obtained by measuring the corrosion occurring in steel specimens exposed to an environment consisting of sea water and varying concentrations of acid or acid ester. These acid and acid ester concentrations are indicated in the table as parts per million parts of sea water; the corresponding rates of corrosion are indicated therein as inches of penetration per year.

*Table 1*

| Inhibitor | Concentration | Rate of Corrosion |
|---|---|---|
| None | | 0.0076 |
| Orthophosphoric acid | 10 | 0.0076 |
| Do | 20 | 0.0072 |
| Do | 30 | 0.0031 |
| Do | 40 | 0.0024 |
| Do | 50 | 0.0012 |
| Do | 60 | 0.0014 |
| Do | 70 | 0.0011 |
| Do | 80 | 0.0011 |
| Do | 90 | 0.0011 |
| Do | 100 | 0.0010 |
| Pyridine phosphate | 100 | 0.0007 |
| Aniline phosphate | 100 | 0.0010 |
| Orthophosphoric acid | 500 | 0.0100 |
| Do | 1,000 | 0.0270 |

It is to be observed, in connection with the above table, that an inhibitor concentration of approximately 100 parts per million parts of sea water may be effective in reducing sea water corrosion to about one-sixth of its normal rate. The table also serves to illustrate the undesirability of adding the inhibitor in amounts sufficient to lower the pH value of the environment to less than 4.5, for it may be seen therein that the addition of orthophosphoric acid in concentrations of 500 and 1000 parts, per million parts of sea water resulted in corrosion rates in excess of the uninhibited rate observed.

Sea water corrosion of ferrous metals frequently has been found to increase with the duration of exposure, depending in part upon the amount of oxygen present in the environment. The present invention now permits a decrease in the rate of attack under conditions which may otherwise engender increased corrosion in an uninhibited environment. This advantage is illustrated in the following table. The data therein tabulated was obtained by alternately exposing steel specimens to sea water for one week and a marine atmosphere for one week over varying periods of time, and subsequently measuring the corrosion that resulted in both an inhibited and uninhibited environment. The inhibitor employed was orthophosphoric acid, at a concentartion of 120 parts per million parts of sea water, and the observed rates of corrosion measured as inches of penetration per year.

| Hours of exposure | Rate of Corrosion in an uninhibited environment | Rate of Corrosion in an inhibited environment |
|---|---|---|
| 336 | 0.0056 | 0.0048 |
| 672 | 0.0066 | 0.0046 |
| 1,008 | 0.0076 | 0.0040 |

This alternating type of exposure to sea water and a marine atmosphere, resulting in increased corrosion, is often encountered in cargo vessels, as previously mentioned, wherein storage compartments within the vessel are initially filled with cargo, then emptied at their destination, exposed to marine atmosphere, and subsequently filled with sea water ballast. As may be seen from the above table, even this type of corrosion may now substantially be inhibited in the manner herein described.

What is claimed is:

1. A method for inhibiting the corrosion of ferrous metals in sea water, which comprises adding to said sea water at least one phosphorus-containing compound selected from the group consisting of orthophosphoric acid, pyridine phosphate, alkylated pyridine phosphates and aniline phosphate, in a concentration greater than 20 parts of said phosphorus-containing compound per million parts of said sea water and effecting a pH value of not less than 4.5 in said sea water.

2. A method for inhibiting the corrosion of ferrous metals in sea water, which comprises adding to said sea water at least one phosphorus-containing compound selected from the group consisting of orthophosphoric acid, pyridine phosphate, alkylated pyridine phosphates and aniline phosphate, in a concentration of between 50 and 150 parts of said phosphorus-containing compound per million parts of said sea water.

3. A method according to claim 2, wherein the phosphorus-containing compound is orthophosphoric acid.

4. A method according to claim 2, wherein the phosphorus-containing compound is pyridine phosphate.

5. A method according to claim 2, wherein the phosphorus-containing compound is an alkylated pyridine phosphate.

6. A method according to claim 2, wherein the phosphorus-containing compound is aniline phosphate.

7. A corrosion inhibiting environment for ferrous metals in contact with sea water, which comprises said sea water, and at least one phosphorus-containing compound selected from the group consisting of orthophosphoric acid, pyridine phosphate, alkylated pyridine phosphates and aniline phosphate, said phosphorus-containing compound being present in said sea water in a concentration greater than 20 parts of said phosphorus-containing compound per million parts of said sea water and effecting a pH value of not less than 4.5 in said sea water.

References Cited in the file of this patent

UNITED STATES PATENTS

| 1,572,354 | Gravell | Feb. 9, 1926 |
| 1,805,982 | Gravell | May 19, 1931 |
| 1,995,954 | Albrecht | Mar. 26, 1935 |
| 2,282,937 | Clark | May 12, 1942 |

FOREIGN PATENTS

| 298,517 | Switzerland | July 16, 1954 |